US008154150B2

(12) United States Patent
Sakai et al.

(10) Patent No.: US 8,154,150 B2
(45) Date of Patent: Apr. 10, 2012

(54) POWER LINE COMMUNICATION SYSTEM (75) Inventors: Katsumi Sakai, Toyama (JP); Koki Goto, Toyama (JP); Hajime Takata, Toyama (JP); Kunihiro Ohta, Toyota (JP)

(73) Assignees: SMK Corporation, Tokyo (JP); Toyota Jidosha Kabushiki Kaisha, Toyota-shi (JP)

( * ) Notice: Subject to any disclaimer, the term of this patent is extended or adjusted under 35 U.S.C. 154(b) by 328 days.

(21) Appl. No.: 12/532,692

(22) PCT Filed: Mar. 24, 2008

(86) PCT No.: PCT/JP2008/055402
§ 371 (c)(1),
(2), (4) Date: Sep. 23, 2009

(87) PCT Pub. No.: WO2008/123182
PCT Pub. Date: Oct. 16, 2008

(65) Prior Publication Data
US 2010/0111201 A1    May 6, 2010

(30) Foreign Application Priority Data
Mar. 27, 2007 (JP) .................................. 2007-080629

(51) Int. Cl.
*B60R 16/03* (2006.01)
*H04B 3/54* (2006.01)
(52) U.S. Cl. ............................................ 307/9.1; 307/1
(58) Field of Classification Search ................ 307/1, 9.1, 307/10.1, 71; 340/531, 533, 538
See application file for complete search history.

(56) References Cited

U.S. PATENT DOCUMENTS

| 6,294,845 | B1 * | 9/2001 | Yoshida et al. | 307/10.6 |
| 7,307,520 | B2 * | 12/2007 | Lamon et al. | 340/538 |
| 7,769,091 | B2 * | 8/2010 | Tsuchida | 375/259 |
| 7,989,997 | B2 * | 8/2011 | Hashimoto et al. | 310/68 D |
| 2003/0052771 | A1 | 3/2003 | Enders et al. | |

(Continued)

FOREIGN PATENT DOCUMENTS

JP         05-022196 A    1/1993
(Continued)

OTHER PUBLICATIONS

Notification Concerning Transmittal of International Preliminary Report on Patentability, Chapter I of the Patent Cooperation Treaty and PCT Written Opinion of the International Searching Authority for PCT/JP2008/055402 dated Oct. 8, 2009 (English-language translation thereof dated Oct. 29, 2009). 13 sheets.

(Continued)

*Primary Examiner* — Dean O Takaoka
(74) *Attorney, Agent, or Firm* — Holtz, Holtz, Goodman & Chick, PC (57) ABSTRACT

A power line communication system which enables high quality communication utilizing a pair of power lines connected to a vehicle mounted battery, has a pair of communication lines connected to a pair of power lines, respectively, to communicate a high frequency signal of 1 MHz or more. This system has a balance filter which is interposed between each of the communication lines and a vehicle mounted communication apparatus, the filter, a circuit configuration of which is formed in balance type. The communication system also has a pair of electrically balanced lines which are connected between the balance filter and each of the communication apparatuses and are power-fed from the battery, for performing communication between the communication apparatuses.

6 Claims, 8 Drawing Sheets

U.S. PATENT DOCUMENTS

| | | |
|---|---|---|
| 2006/0224278 A1 | 10/2006 | Yanagida et al. |
| 2009/0237225 A1 | 9/2009 | Enders et al. |

FOREIGN PATENT DOCUMENTS

| | | |
|---|---|---|
| JP | 2002-010366 A | 1/2002 |
| JP | 2003-209497 | 7/2003 |
| JP | 2004-056197 A | 2/2004 |
| JP | 2004-096331 A | 3/2004 |
| JP | 2004-0906331 A | 3/2004 |
| JP | 2004-229250 A | 8/2004 |
| JP | 2006-067421 A | 3/2006 |
| JP | 2006-287576 A | 10/2006 |

OTHER PUBLICATIONS

Japanese Office Action dated Jun. 2, 2010 (and English translation thereof) in counterpart Japanese Application No. 2007-080629.
Japanese Office Action dated Aug. 25, 2010 (and English translation thereof) in counterpart Japanese Application No. 2007-080629.

* cited by examiner

POWER LINE COMMUNICATION SYSTEM

This application is a U.S. National Phase Application under 35 USC 371 of International Application PCT/JP2008/055402 filed Mar. 24, 2008.

TECHNICAL FIELD

The present invention relates to a power line communication system for performing communication between electronic apparatuses, employing a power line connected to a vehicle-mounted direct-current power source.

BACKGROUND ART

Conventionally, a number of vehicle mounted electrical apparatuses operating upon receipt of electric power are connected to lines connected to automobile batteries. In general, automobile wiring is such that a ground-side terminal is connected to a vehicle body frame or the like, that is, the terminal is connected to a so-called body earth.

On the other hand, in recent years, vehicle mounted electronic apparatuses have increased, and lines for communication between a control unit for controlling various apparatuses and an electronic apparatus have increased. Accordingly, power lines and communication lines become necessary for vehicle mounted electric apparatuses, wire harnesses which are wiring lines increase, thus hindering automobile weight reduction. Therefore, as disclosed in Patent Document 1, a power line communication system is proposed as a technique which is capable of reducing the number of wire harnesses by utilizing power lines laid out in a vehicle, as a transmission medium. This Power Line Communication (PLC) uses already-existing power lines, thus eliminating a need to provide a leased line for communication. Hence, the number of wire harnesses in a vehicle is reduced, contributing to automobile weight reduction or parts reduction.

Figure 7:
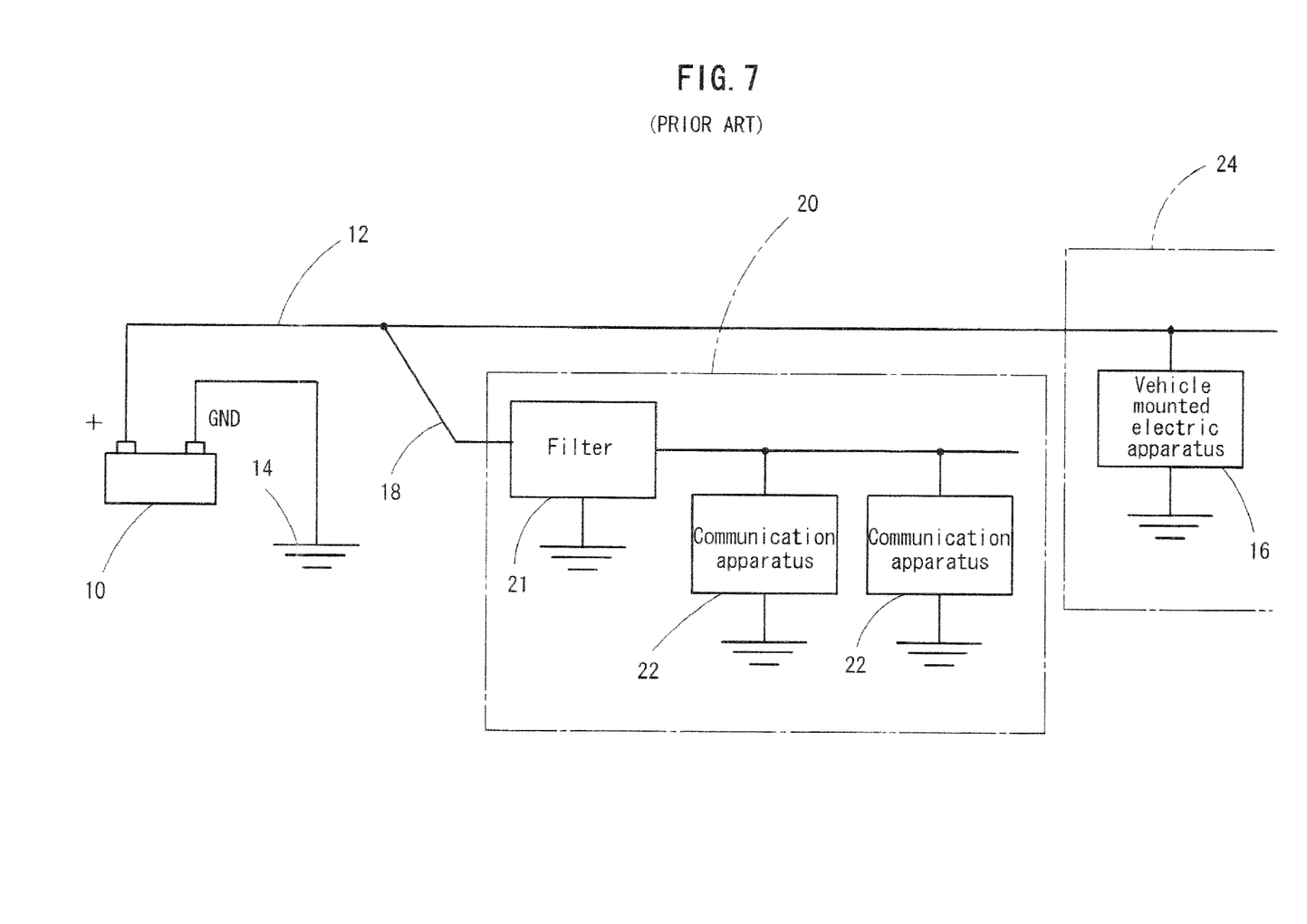
FIG. 7 It is a schematic block diagram showing a conventional vehicle mounted power line communication system.

In this vehicle mounted power line communication system, as shown in FIG. 7, a line 12 for power feeding is connected to a positive pole side of a battery 10, and a ground terminal which is a negative pole side of the battery 10 is connected to a body earth 14 such as a vehicle chassis. A number of vehicle mounted electric apparatuses 16 are connected to the line 12 at the positive pole side, each of which has its own function. In addition, a plurality of communication apparatuses 22 are connected to a communication line 18 branching from the line 12, via a predetermined frequency filter 21. The filter 21 increases the impedance of communication lines in a power line communication block 20 connected to the communication line 18, preventing a high frequency signal employed in power line communication from propagating to a non-power line communication block 24 of an electronic apparatus which does not perform power line communication.

Figure 8:
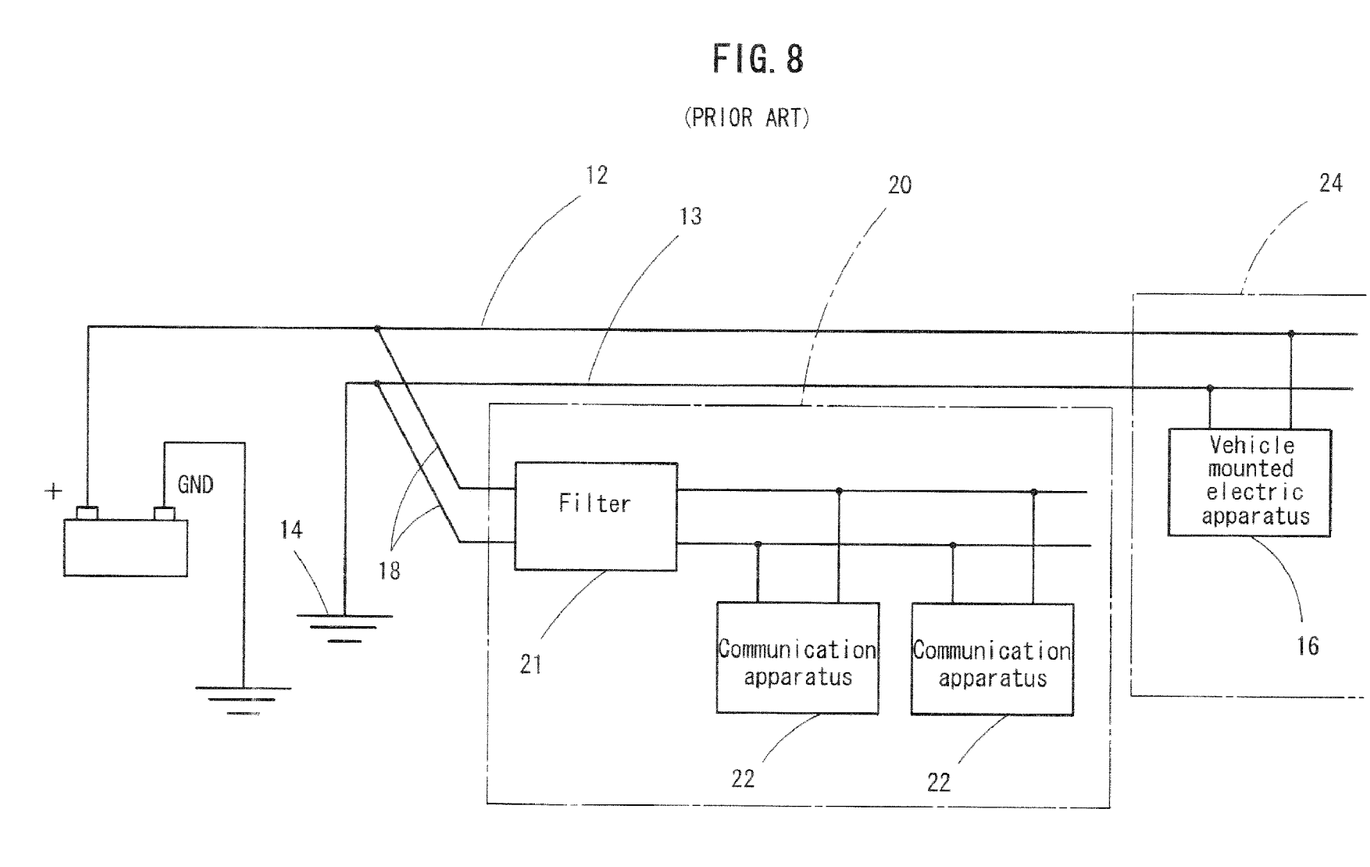
FIG. 8 It is a schematic block diagram showing another conventional vehicle mounted power line communication system.

In addition, as shown in FIG. 8, with a negative-pole power line being connected from a body earth, the communication line 18 is laid out in a pair of positive and negative lines.

Patent Document 1: Japanese Laid-open Patent Application No. 2004-56197

DISCLOSURE OF THE INVENTION

Problem(s) to Be Solved by the Invention

Figure 9:
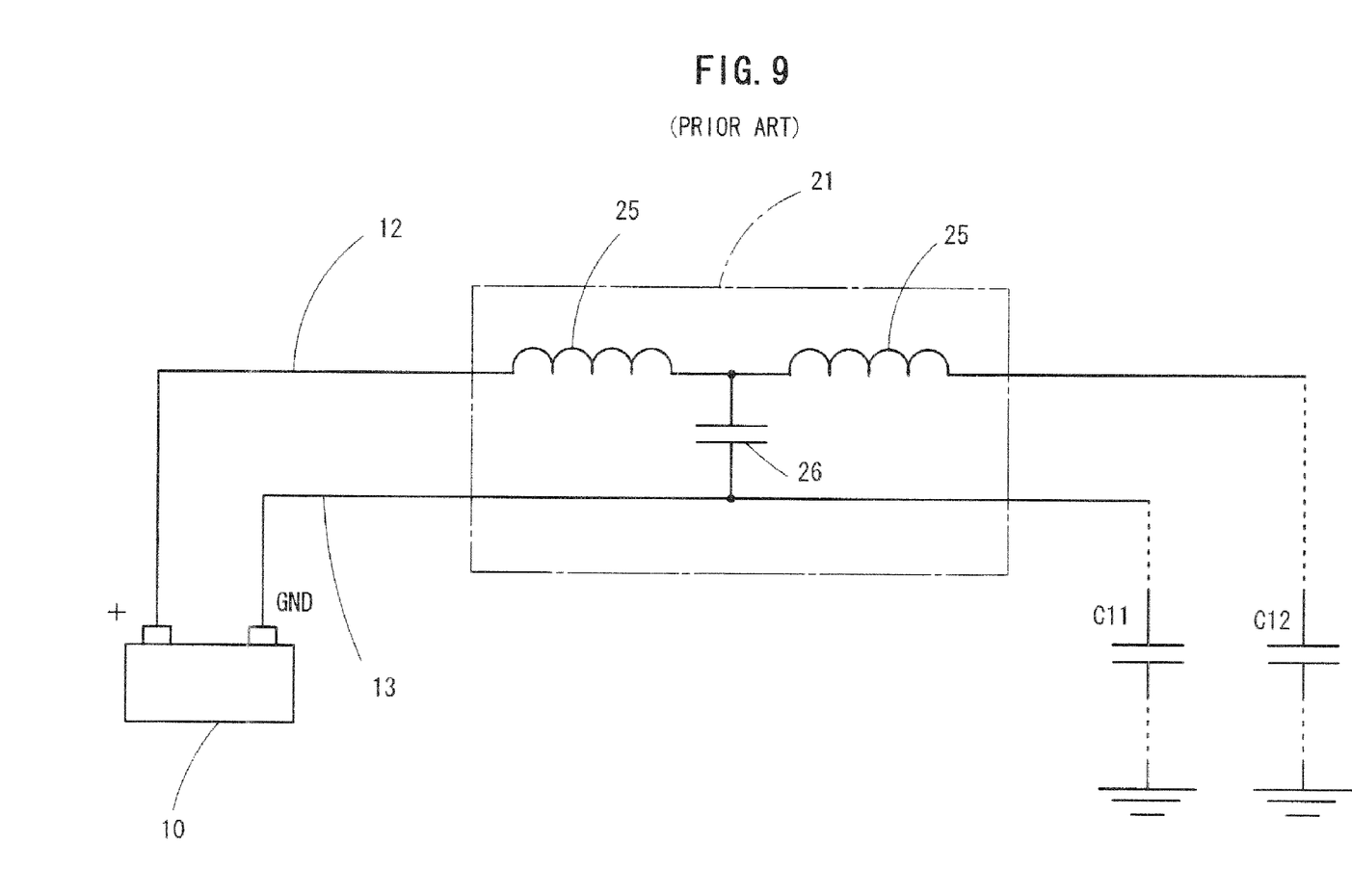
FIG. 9 It is a circuit diagram showing a configuration of a filter in the conventional vehicle mounted power line communication system.

In the case of the configuration shown in FIG. 7, of the above-described prior art, a body earth is utilized in a communication pathway for performing, power line communication. Thus, in the case of considering a communication pathway with a pair of positive, and negative lines, the communication pathway remains unbalanced, and a required constant quality of communication has not been assured. In addition, in a configuration of the filter 21, as shown in FIG. 9, a coil 25 is not disposed in a power line 13 at the negative pole side, and the impedance viewed from the ground side that is a negative pole is different from the one viewed from the positive pole side. In other words, the disposition of a pair of the coils 25 and a capacitor 26 remains unbalanced. Therefore, in power line communication for superimposing a high frequency signal, there has been a problem that communication reliability is lowered, and there has also been a danger that an electronic apparatus malfunctions due to "leak" radio waves. Further, if two lines for performing power line communication are laid out distantly in random order, the impedances of stray capacitances C11, C12 viewed from the ground side are different from each other, and the circuit configuration becomes unbalanced.

It is known that if a communication pathway remains unbalanced, a signal transmission speed or a transmission distance is adversely affected, a "leak" electric field arises on the communication pathway, and electromagnetic waves are radiated. In particular, owing to an increase of vehicle mounted electric apparatuses and increased and complicated communication data of recent years, improvement of a communication speed is required, whereas the "leak" radio waves due to an increased frequency become problematic.

In addition, also in a circuit configuration of power line communication as shown in FIG. 8, disclosed in Patent Document 1, a negative-pole power line for power line communication is connected to a ground-side terminal of a battery 10 via a body earth, and is formed to be an unbalanced circuit. Therefore, the wiring, and filter configuration of the power line communication system for superimposing a high frequency signal also fails to suggest a concept of disposition in a balanced state.

The present invention has been made in view of the above-described problems of the prior art, and aims to provide a power line communication system which enables high quality communication, utilizing a power line connected to a vehicle mounted battery.

Means for Solving the Problem(s)

The present invention is directed to a power line communication system for performing communication with a high frequency signal of 1 MHz or more being superimposed on a direct-current power line connected to a vehicle mounted battery, said system comprising;

a pair of communication lines which are connected to a pair of power lines, respectively;

a balance filter which is interposed between the communication lines and a vehicle mounted communication apparatus, a circuit configuration of which is formed in balance type; and a pair of electrically balanced lines which are connected between the balance filter and each of the communication apparatuses and are power-fed from a battery, for performing communication between the communication apparatuses.

An electrically balanced termination is connected to an end part of the balanced lines, In addition, the balanced lines may be a twisted pair of lines or a pair of lines wired in intimate contact with each other. Further, it is preferable that they are shielded.

Advantageous Effect(s) of the Invention

According to the power line communication system of the present invention, a communication pathway in a vehicle mounted communication apparatus is balanced; communication is stabilized; and high quality communication can be maintained. In addition, the communication lines are balanced, thereby making it possible to prevent operation of a vehicle mounted electric apparatus from being adversely affected due to propagation and radiation or a high frequency signal used in power line communication. In particular, even if a high frequency is realized in order to increase a communication speed relative to an increase of communication data of the vehicle mounted communication apparatus, the "leak" radio waves due to a communication signal do not arise, and the vehicle mounted electronic device is not adversely affected.

EXPLANATION OF REFERENCE NUMERALS

10 Battery
12, 13 Power lines
14 Body earth
16 Vehicle mounted electric apparatus
18 Communication line
20 Power line communication block
22 Communication apparatus
24 Non-power line communication block
26 Balance filter
28 Balanced lines
30 Termination

BEST MODE FOR CARRYING OUT THE INVENTION

Figure 1:
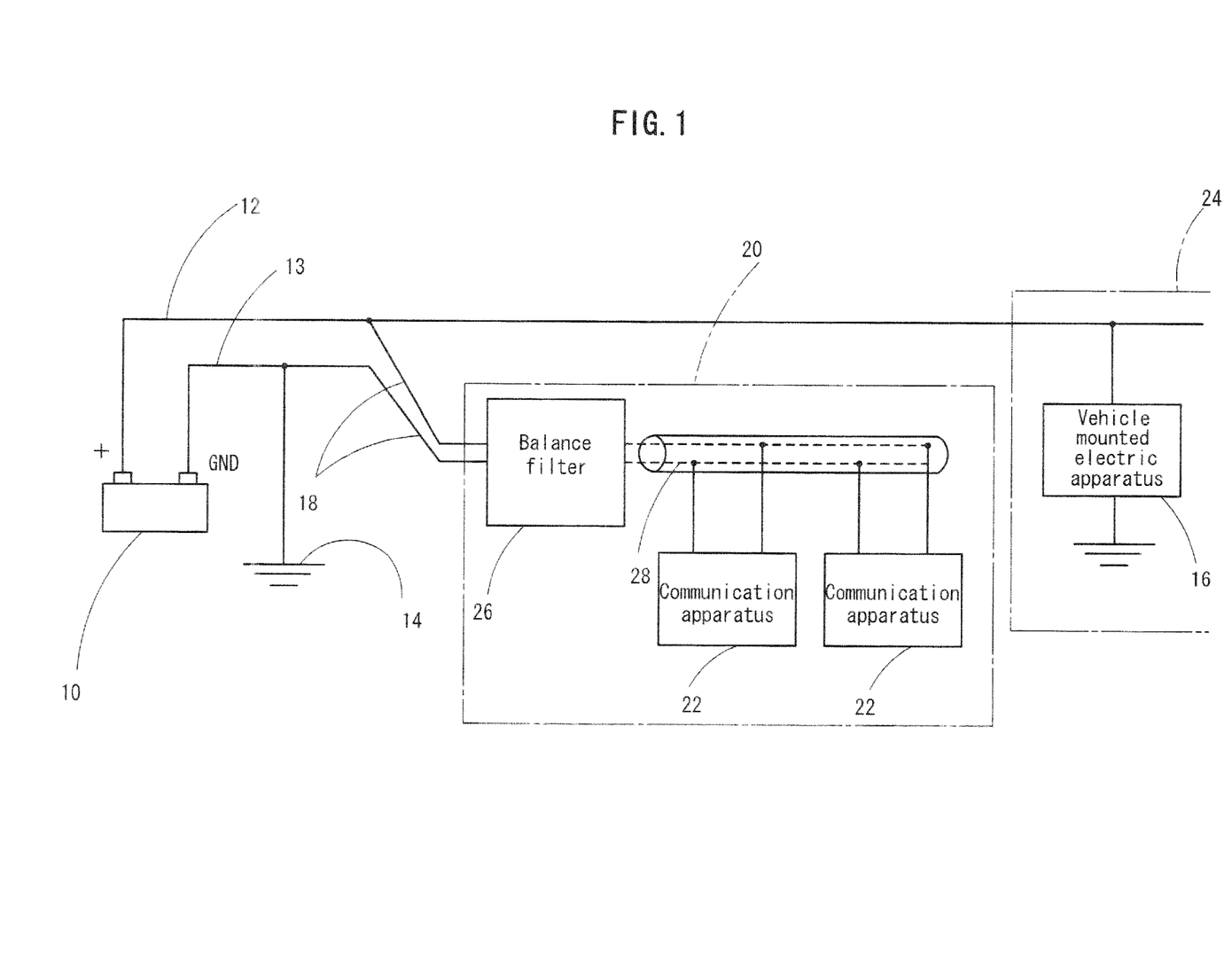
FIG. 1 It is a schematic block diagram showing a configuration of a power line communication system in one embodiment of the present invention.
Figure 2:
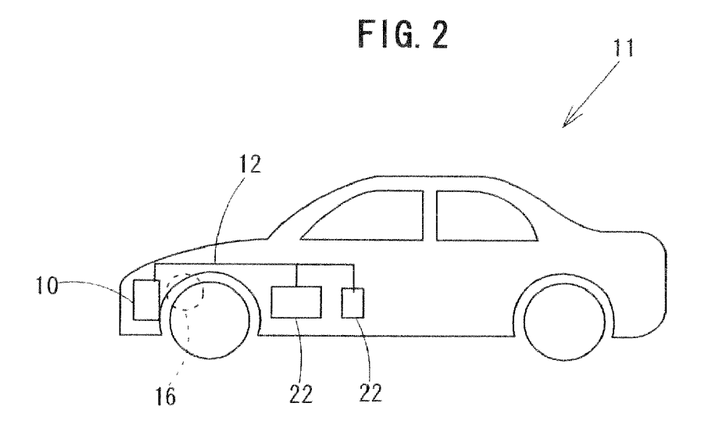
FIG. 2 It is a schematic view showing a vehicle in which the power line communication system of the embodiment is employed.
Figure 3:
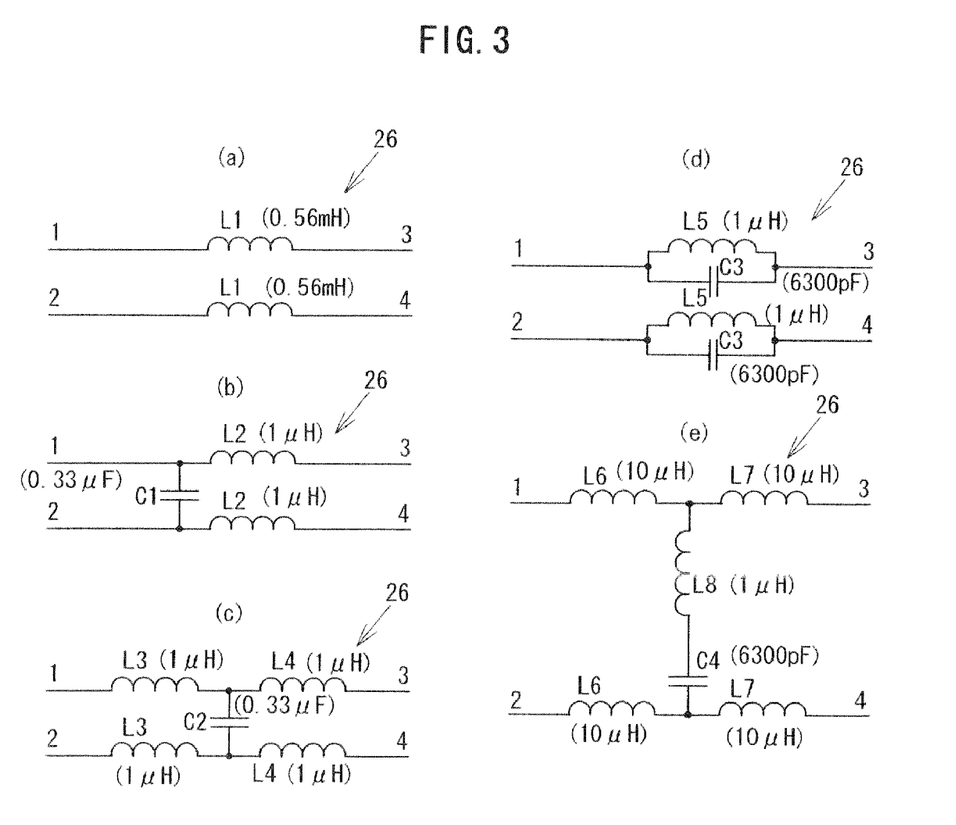
FIGS. 3A to 3E They are circuit diagrams, each of which shows an example of a balance filter in the power line communication system of the embodiment.

Hereinafter, one embodiment of a power line communication system according to the present invention will be described referring to FIGS. 1 to 3. The power line communication system of the embodiment, as shown in FIG. 2, employs power lines 12, 13 for power feeding, connected to a battery 10 which is a direct-current power source of an automobile 11. As shown in FIG. 1, the power line 12 for power feeding is connected to a positive pole side of the battery 10, and the power line 13 is also connected to a negative pole which is a ground-side terminal of the battery 10. The power line 12 at the positive pole side feeds power to a plurality of vehicle mounted electric apparatuses 16 such as a motor. In addition, the power line 13 at the negative pole side is connected to the vehicle chassis or the like, and is connected to the body earth. In the embodiment, the vehicle mounted electric apparatuses 16 are constituted so that the terminal at the negative pole side is connected to the body earth.

Further, a pair of communication lines 18 branch from the power lines 12, 13; are connected to a plurality of communication apparatuses 22 such as car navigation or car audio equipment, via a balance filter 26 which is a predetermined frequency filter; and perform power feeding. Furthermore, lines extending from the balance filter 26 are a pair of lines which are balanced. A twisted pair of lines for communication or balanced lines 28 such as shielded lines to winch shielding has been applied, for example, are employed, and these lines have both a function of power feeding from the battery 10 and a function of communication between the communication apparatuses 22.

The balance filter 26, as shown in FIG. 3A to 3E, is made up of coils and capacitors, and is connected between the pair of communication lines 18 and the balanced lines 28. Each constant value of FIG. 3 indicates one example which is preferred in a case where a frequency bandwidth of superimposed radio waves is 2 MHz or more and 30 MHz or less. In the balance filter 26, with respect to a frequency of a communication signal, inductance and capacitance are set, respectively, in accordance with a combination of a coil and a capacitor or the like, so as to produce impedance which is greater than an electrical signal of another frequency. A terminal 1 of the balance filter 26, shown in FIGS. 3A to 3E, connects to the power line 12 at the positive pole side, and a terminal 2 connects to the ground-side power line 13 at the negative pole side. In addition, a terminal 3 of the balance filter 26 is connected to the positive pole side of the balanced line 28 connected to the communication apparatus 22, and a terminal 4 is connected to the negative pole side of the communication line 18. In this manner, the impedance of the communication line in a power line communication block 20 is increased, preventing the high frequency signal employed in power line communication from propagating to a non-power line communication block 24 for electronic apparatus which does not perform power line communication, and preventing noise from entering the balanced lines 28.

As a filter circuit example of the balance filter 26, FIG. 3A shows a schematic configuration in which each coil L1 of the same inductance value, as illustrated, is disposed between the communication lines 18 and the balanced lines 28. FIG. 3B shows a configuration in which each coil L2 of the same inductance value, as illustrated, is connected via a capacitor C1. FIG. 3C shows a configuration in which: coils L3, L4 of the same inductance value, as illustrated, are connected in series; a pair of like constituent elements are further provided; each terminal is interposed between the communication line 18 and the balanced line 28; and the coils L3, L4 are connected to each other via a capacitor C3. FIG. 3D shows an exemplary configuration in which: a coil L5 and the capacitor C3 are connected in parallel; and one pair of circuits having the same inductance value and capacitance value, as illustrated, are connected between the communication lines 18 and the balanced lines 28. FIG. 3E shows a configuration in which: one pair of circuits in which coils L6, L7 of the same inductance value, as illustrated, are connected in series, are connected between the communication lines 18 and the balanced lines 28; and the coils L6, L7 are connected via a serial circuit of a capacitor 4 and a coil L8. In the configuration of these filter circuits, the impedances viewed from the positive pole side and the negative pole side of the communication lines 18 and the balanced lines 28 are equal to each other.

In the vehicle mounted power line communication system of the embodiment, a pair of lines which are equal to each other in impedance viewed from the positive and negative poles and are electrically balanced are connected to the communication lines 18 connected to the power lines 12, 13. Further, in the filter 26 disposed between the communication apparatus 22 and each of the power lines 12, 13, elements are disposed so as to form a circuit configuration in which the impedances viewed from the positive and negative poles are equal to each other. In this manner, in power line communication utilizing the vehicle mounted power lines 12, 13 with much noise as well, high quality, stable communication becomes possible, and moreover, the "leak" radio waves, which may adversely affect another electronic apparatus, do not arise.

Figure 4:
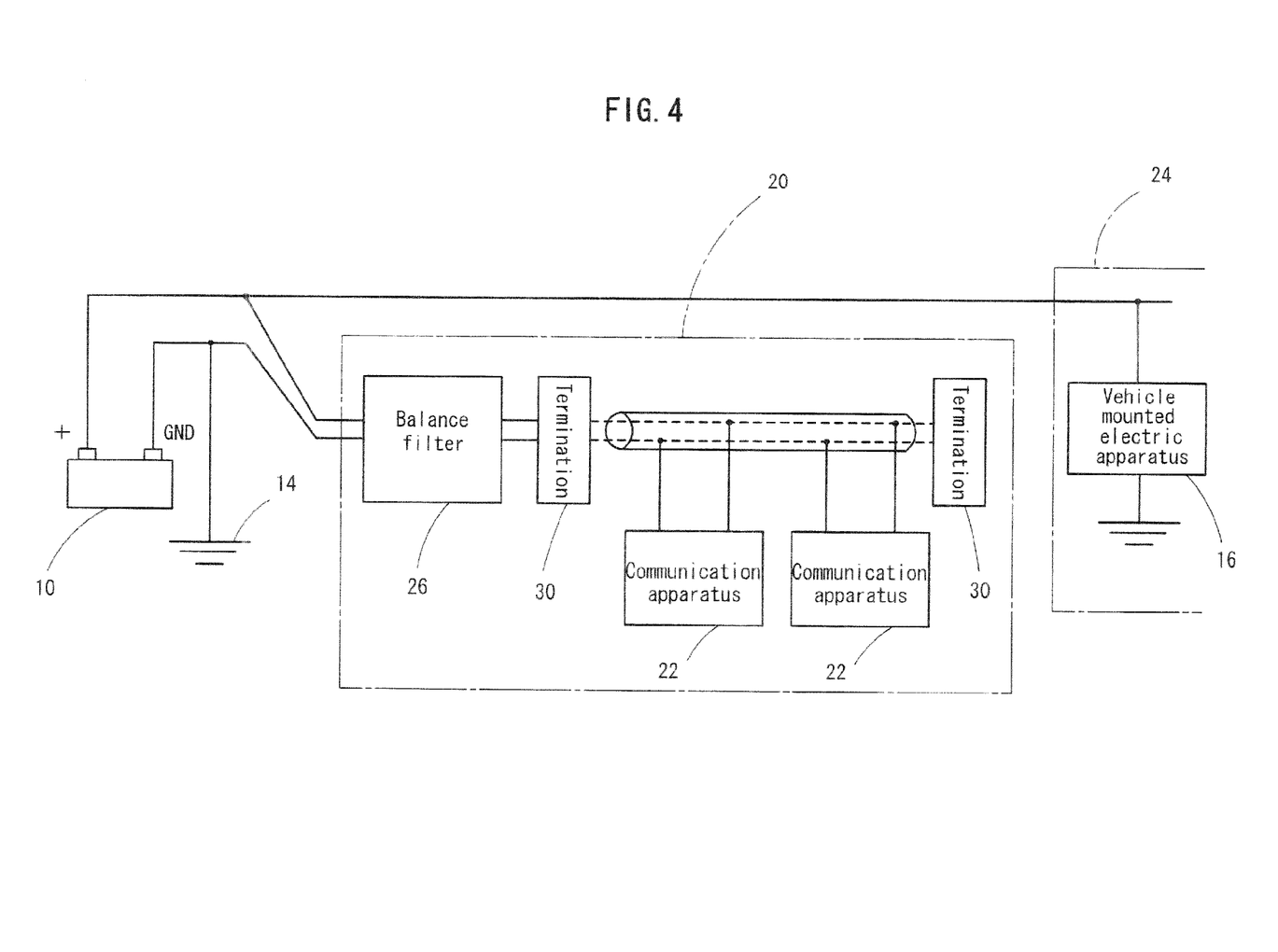
FIG. 4 It is a schematic block diagram showing another embodiment of the power line communication system or the present invention.
Figure 5:
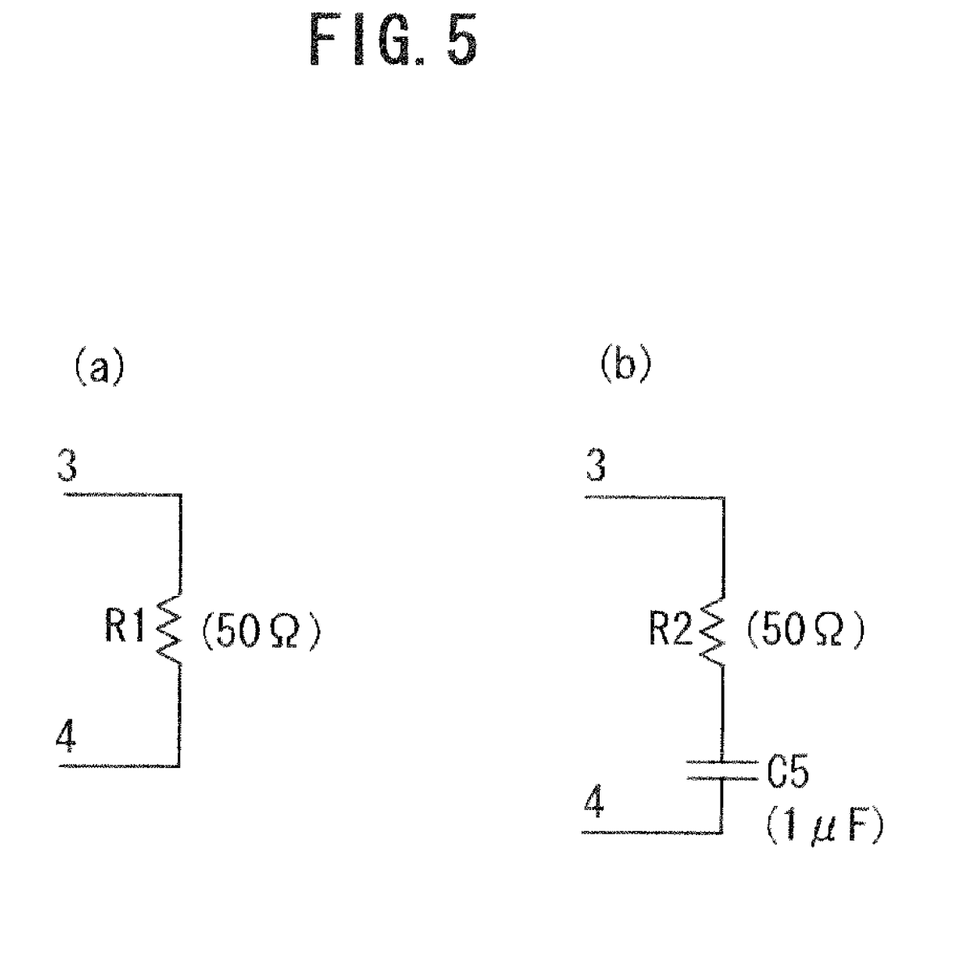
FIG. 5 it is a circuit diagram showing an example of a termination in an another embodiment FIG. 6 It is a schematic block diagram showing a still another embodiment of the power line communication system of the present invention.

The power line communication system of the present invention is not limitative to the above-described embodiment, and as shown in FIG. 4, terminations 30 may be connected to both ends of the balanced line 28 in order to restrain reflection of a high frequency signal. As a circuit configuration of the termination 30, FIG. 5 shows one example which is preferred in a case where a frequency bandwidth is 2 MHz or more and 30 MHz or less. In this circuit configuration as well, the impedances viewed from the positive and negative pole sides of the communication line 18 are equal to each other so as to keep a balance.

Figure 6:
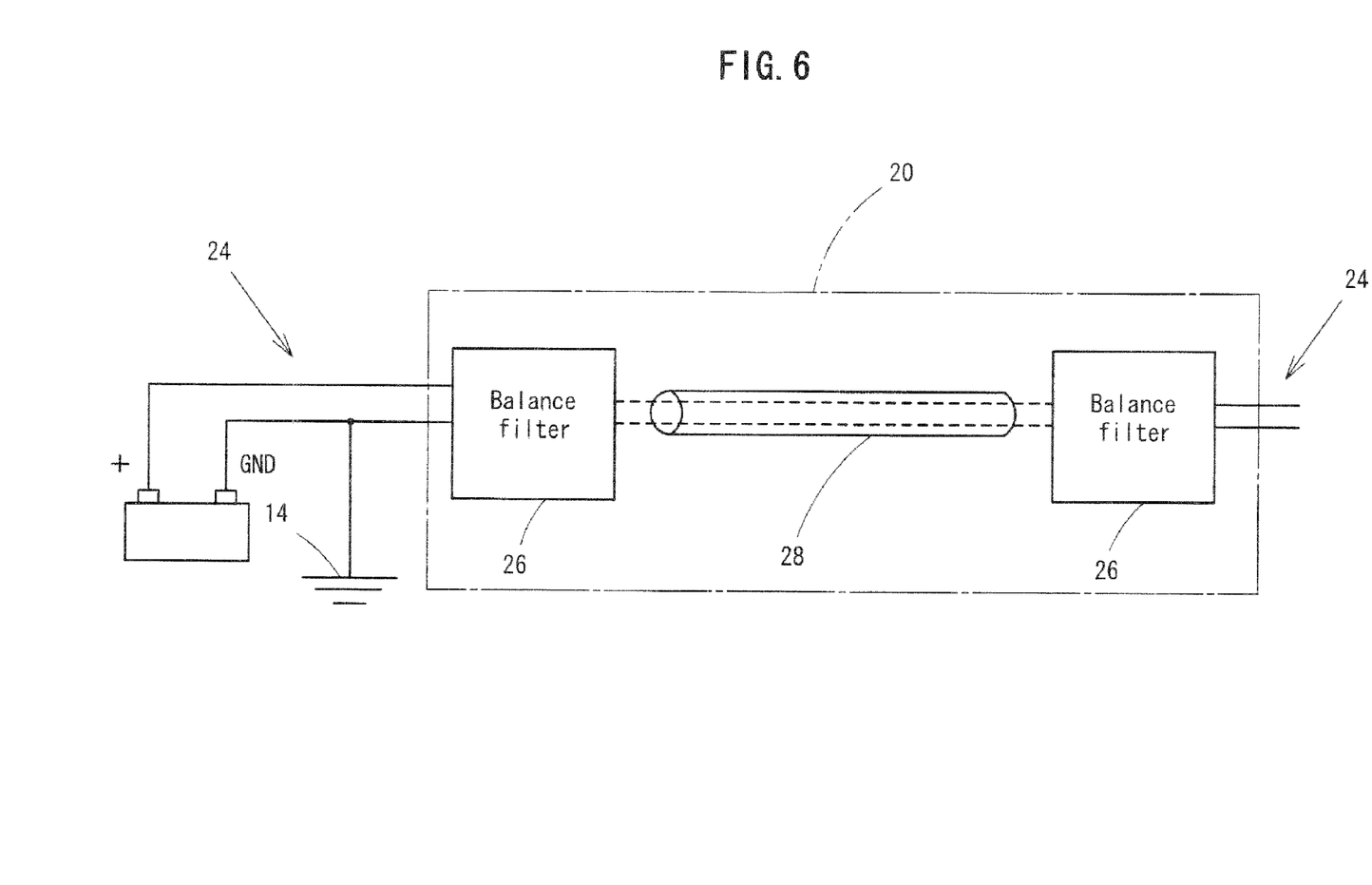

In addition, as shown in FIG. 6, the power line communication block 20 may be provided while it is sandwiched between the non-power line communication blocks 24 which do not perform power line communication. In this case, the balance filter 26 is provided at both sides of the power line communication block 20. Apart from the twisted pair of lines, the balanced lines may be a pair of lines insulated from each other and intimately wired. Further, it is preferable that they are shielded with a metal foil or a metal lath.

The frequency bandwidth at which the power line communication system of the present invention is utilized may be 1 MHz or more, and is preferred in a case where it is 30 MHz or less, in consideration of laws and regulations or the like.

The invention claimed is:

1. A power line communication system for performing communication with a high frequency signal of at least 1 MHz which is superimposed on a direct-current power line connected to a vehicle mounted battery, said system comprising:
   a pair of communication lines which are connected to a pair of power lines, respectively;
   a balance filter which is interposed between the communication lines and vehicle mounted communication apparatuses, a circuit configuration of which is formed in balance type; and
   a pair of electrically balanced lines which are connected between the balance filter and each of the communication apparatuses, and which are power-fed from the battery, and which perform communication between the communication apparatuses.

2. The power line communication system according to claim 1, wherein an electrically balanced termination is connected to an end part of each of the balanced lines.

3. The power line communication system according to claim 1, wherein the balanced lines are a twisted pair of lines.

4. The power line communication system according to claim 3, wherein the balanced lines are shielded.

5. The power line communication system according to claim 1, wherein the pair of balanced lines are insulated from each other, and are brought into intimate contact with each other.

6. The power line communication system according to claim 5, wherein the balanced lines are shielded.

* * * * *